(12) United States Patent
Lepo et al.

(10) Patent No.: US 10,717,794 B2
(45) Date of Patent: Jul. 21, 2020

(54) AQUEOUS POLYMER DISPERSION, ITS USE AND METHOD FOR PREPARING AQUEOUS POLYMER DISPERSION

(71) Applicant: Kemira Oyj, Helsinki (FI)

(72) Inventors: Anneli Lepo, Tampere (FI); Helena Peuranen, Espoo (FI)

(73) Assignee: Kemira Oyj, Helsinki (FI)

( * ) Notice: Subject to any disclaimer, the term of this patent is extended or adjusted under 35 U.S.C. 154(b) by 102 days.

(21) Appl. No.: 16/078,077

(22) PCT Filed: Mar. 22, 2017

(86) PCT No.: PCT/FI2017/050199
§ 371 (c)(1),
(2) Date: Aug. 21, 2018

(87) PCT Pub. No.: WO2017/162922
PCT Pub. Date: Sep. 28, 2017

(65) Prior Publication Data
US 2019/0040169 A1 Feb. 7, 2019

(30) Foreign Application Priority Data
Mar. 22, 2016 (FI) ...................... 20165236

(51) Int. Cl.
| | | |
|---|---|---|
| *C08F 212/08* | (2006.01) | |
| *C08F 220/18* | (2006.01) | |
| *D21H 19/58* | (2006.01) | |
| *C08F 251/00* | (2006.01) | |
| *D21H 21/10* | (2006.01) | |
| *C09D 151/02* | (2006.01) | |
| *C08F 2/20* | (2006.01) | |
| *C08F 220/14* | (2006.01) | |
| *C08L 3/02* | (2006.01) | |
| *C08K 3/013* | (2018.01) | |

(52) U.S. Cl.
CPC ............ *C08F 212/08* (2013.01); *C08F 2/20* (2013.01); *C08F 220/14* (2013.01); *C08F 220/18* (2013.01); *C08F 251/00* (2013.01); *C08L 3/02* (2013.01); *C09D 151/02* (2013.01); *D21H 19/58* (2013.01); *D21H 21/10* (2013.01); *C08F 2500/24* (2013.01); *C08F 2800/20* (2013.01); *C08K 3/013* (2018.01)

(58) Field of Classification Search
CPC ........ C08F 212/08; C08F 2/20; C08F 220/14; C08F 220/18; C08F 251/00; C08F 2500/24; C08F 2800/20; C08L 3/02; C09D 151/02; D21H 19/58; D21H 21/10; C08K 3/013
USPC ....................................................... 526/200
See application file for complete search history.

(56) References Cited

U.S. PATENT DOCUMENTS

| | | |
|---|---|---|
| 6,426,381 B1 | 7/2002 | Koenig et al. |
| 6,800,675 B1 | 10/2004 | Pfalz et al. |
| 2003/0106659 A1 | 6/2003 | Malmström et al. |
| 2010/0159263 A1 | 6/2010 | Ahlren et al. |
| 2010/0160498 A1 | 6/2010 | Aarni et al. |
| 2012/0180970 A1 | 7/2012 | Song et al. |
| 2013/0184407 A1* | 7/2013 | Peuranen ............... D21H 17/36 524/734 |
| 2014/0275415 A1 | 9/2014 | Cimpeanu et al. |

FOREIGN PATENT DOCUMENTS

| | | |
|---|---|---|
| RU | 2509834 C1 | 3/2014 |
| WO | 00/46264 A1 | 8/2000 |
| WO | 2010/070205 A1 | 6/2010 |

OTHER PUBLICATIONS

Finnish Patent and Registration Office, Search Report for appln. No. 20165236 dated Oct. 10, 2016.

* cited by examiner

*Primary Examiner* — William K Cheung
(74) *Attorney, Agent, or Firm* — Berggren LLP

(57) ABSTRACT

The invention relates to an aqueous polymer dispersion having a viscosity of ≤150 m Pas at 40% solids content and comprising polymer particles having a particle size D50 less than 85 nm. The polymer dispersion is obtainable by free radical emulsion copolymerisation of at least monomer (a) and monomer (b), where monomer (a) is at least one optionally substituted styrene and monomer (b) is at least one C1-C4-alkyl (meth)acrylate, in a reaction mixture comprising degraded starch which has an average molecular weight Mn<1000 g/mol. The invention relates also to the use of the polymer dispersion and method for preparing it.

14 Claims, No Drawings

AQUEOUS POLYMER DISPERSION, ITS USE AND METHOD FOR PREPARING AQUEOUS POLYMER DISPERSION

PRIORITY

This application is a U.S national application of the international application number PCT/FI2017/050199 filed on Mar. 22, 2017 and claiming priority of Finnish national application No. 20165236 filed on Mar. 22, 2016 the contents of all of which are incorporated herein by reference.

The present invention relates to an aqueous polymer dispersion, its use and a method for preparing an aqueous polymer dispersion according to the preambles of the enclosed independent claims.

Starch graft copolymer dispersions are used in pulp and papermaking. They can be used for various purposes, for example for surface sizing compositions or for increasing the dry strength of paper. For example, U.S. Pat. No. 6,426,381 discloses styrene/(meth)acrylate copolymers that can be used for surface sizing. The aqueous polymer dispersion is obtained by copolymerization of ethylenically unsaturated monomers in the presence of starch. The used starch is degraded starch and has an average molecular weight Mn of 500 to 10,000.

Rheology modifies are used in coating colors, which are applied on the surface of paper, board or the like. A coating color is typically a composition comprising inorganic mineral particles, water, natural and/or synthetic polymeric binder(s) and rheology modifier(s). Rheology modifiers are used to change the flow characteristics of the color. Rheology modifier enables good water retention and viscosity behavior of the coating color. Water retention of the coating color describes the ability of the coating color to maintain the aqueous phase in contact with the mineral particles of the coating color. Water retention enables build-up of even hydrodynamic pressure under the metering blade, good runnability and smooth coating surface. If the water retention of the coating color is too low, the water in the coating color is adsorbed by the base paper too quickly, and the coating is settled on the paper surface too rapidly.

It is known to use starch, carboxymethyl cellulose, polyvinyl alcohol or synthetic thickeners as rheology modifiers. They improve the water retention to the coating color, but simultaneously also increase the viscosity of the coating color. Therefore they can be used only in limited amounts, and the improvements in water retention must be balanced with the problems resulting from increased coating viscosity. Thus there is a need for a rheology modifier that can provide good water retention and have good viscosity behavior.

An object of this invention is to minimise or even eliminate the disadvantages existing in the prior art.

An object is also to provide an aqueous polymer dispersion which provides optimal water retention and viscosity behavior when used in a coating color.

These objects are attained with a method and an arrangement having the characteristics presented below in the characterising parts of the independent claims. Some preferable embodiments of the invention are described in the dependent claims.

A typical aqueous polymer dispersion according to the present invention has a viscosity of ≤150 mPas at 40% solids content and comprises polymer particles having a particle size D50 less than 85 nm, the polymer dispersion being obtained by free radical emulsion copolymerization of at least monomer (a) and monomer (b), where monomer (a) is at least one optionally substituted styrene, and monomer (b) is at least one C1-C4-alkyl (meth)acrylate, in a reaction mixture comprising degraded starch which has an average molecular weight Mn<1000 g/mol.

Typical method according to the present invention for preparing an aqueous polymer dispersion according to the present invention comprises free radical emulsion copolymerization of at least monomer (a) and monomer (b), where monomer (a) is at least one optionally substituted styrene, and monomer (b) is at least one C1-C4-alkyl (meth)acrylate, in a reaction mixture comprising degraded starch which has an average molecular weight Mn<1000 g/mol.

A typical use according to the present invention of aqueous polymer dispersion is as a retention modifier in a coating color for improving the water retention of the coating color.

Now it has been surprisingly found that when the free radical emulsion copolymerization is performed in presence of degraded starch, which has an average molecular weight Mn<1000 g/mol, the resulting polymer dispersion has high solids content but low viscosity, which is advantageous in view of production of the dispersion in industrial scale. Furthermore, the obtained polymer dispersion shows unexpected improvement when it is used as a rheology modifier in a coating color. It provides the coating color with excellent water retention and viscosity properties, both as low shear and at high shear. The origin of the observed effect is not yet fully understood. It is assumed, without wishing to be bound by a theory that the strongly degraded starch is capable of effectively forming hydrogen bonds and retaining water in the coating color, while providing low viscosity both at low and high shear rates. It is unexpected that the degree of starch degradation has so strong positive effect on the properties of polymer dispersion and its compatibility with other coating color components.

The polymerization by using a graft-linking water-soluble redox system as free radical initiator is performed in the reaction mixture, which comprises starch and at least monomers (a) and (b).

The aqueous polymer dispersion has viscosity ≤150 mPas, measured at 40 weight-% solids content, at 25° C., by using Brookfield LVDV viscometer with spindle 18 and using the highest feasible rotation speed for the spindle. Preferably the aqueous polymer dispersion has the viscosity in the range of 1-150 mPas, preferably 5-100 mPas, more preferably 5-70 mPas, even more preferably 5-49 mPas, measured at 40 weight-% solids content, at 25° C., by using Brookfield LVDV viscometer with spindle 18.

Low number average molecular weight of the degraded starch reduces the viscosity increasing effect of the polymer dispersion in the coating composition and simultaneously also increases the retention of water into the coating color composition. This improves the behavior of the coating color, especially in blade coating as well as the runnability of the coating color at the coating blade. The coating color is not subjected to a viscosity increase under the blade pressure, and the polymer dispersion helps to retain water optimally in the coating layer, thus providing a smooth and defect-free coating result. Furthermore, the low average molecular weight Mn of the degraded starch ensures that the particle size of the polymer particles in the dispersion remains small. According to one preferable embodiment of the invention the degraded starch has an average molecular weight Mn<1000 g/mol, preferably <800 g/mol, more preferably <500 g/mol. The degraded starch may have the average molecular weight Mn in the range of 100-990 g/mol, preferably 100-790 g/mol, more preferably in the range of 100-490 g/mol, even more preferably 100-400 g/mol. The average molecular weight Mn of the starch can be determined, for example, by using size-exclusion chromatography (SEC) employing following equipment and procedure: Viscotek GPCmax TDA 302 SEC equipment, column set comprising three columns (Waters Ultrahydrogel 2000, 500 and 120) and a guard column. Eluent is aqueous 0.1 M $NaNO_3$ with 2.5% (v/v) acetonitrile with a flow rate of 0.8 ml/min in 35° C. Injection volume is 50 µL with a sample concentration of 2 mg/ml. Signal from the differential refractive index detector is used for conventional column calibration with sodium polyacrylate standards. Ethylene glycol is used as an internal standard.

Degraded starch may be obtained by subjecting starch to oxidative, thermal, acidic, hydrolytic or enzymatic degradation. The oxidative degradation is presently being preferred. Hypochlorite, peroxodisulphate, hydrogen peroxide or their mixtures may be used as oxidising agents. According to one embodiment starch is degraded with hypochlorite for improving the dissolution properties of the starch, and after that a further degradation, for example with hydrogen peroxide, is carried out, e.g. shortly before the subsequent copolymerization. In this case, hydrogen peroxide (calculated as 100%) is used in concentrations of 0.3 to 5.0 weight-%, based on starch employed. The exact amount of hydrogen peroxide depends on the final molecular weight to which the starch is to be degraded.

Degraded starch, which is used in the present invention, may be any suitable degraded natural starch, such as potato, rice, corn, waxy corn, wheat, barley or tapioca starch. Starches having an amylopectin content >80%, preferably >95% are advantageous.

The degraded starch may be non-ionic or have an anionic net charge. Starch which has anionic net charge may be anionic, i.e. contain only anionically charged groups, or amphoteric, i.e. contain both anionically and cationically charged groups as long as the net charge of the starch is anionic. Degraded starch is preferably anionic or amphoteric with the net anionic charge. Anionic or amphoteric starch comprises anionic groups, such as carboxylate or phosphate groups. Degree of substitution, DS, indicating the number of charged groups in the starch on average per glucose unit, is typically 0.01-0.20. According to one preferable embodiment of the invention the degraded starch is degraded anionic potato or tapioca starch.

It is also possible to use chemically modified starches, such as hydroxyethyl- or hydroxypropyl-starches.

Before the polymerization the degraded starch is dissolved into water by heating and an aqueous solution of degraded starch is obtained. According to one embodiment of the invention the viscosity of the degraded starch in solution form is <15 mPas, preferably <10 mPas, measured from 15 weight-% solution, at 25° C., with Brookfield LVDV viscometer with spindle 18, 60 rpm. The viscosity of the starch solution is measured before the addition of monomers and formation of the reaction mixture.

The degraded starch solution may be heated to a value above its glutenization temperature before the beginning of the polymerization. Typically the polymerization steps of the polymerization process are performed at temperature range 30-100° C., preferably between 70-98° C. The temperature may be >100° C. in case a pressure reactor under superatmospheric pressure is employed.

According to one embodiment of the invention the amount of degraded starch in the reaction mixture at the beginning of the polymerization and before the addition of the monomers is in the range of 5-60 weight-%, preferably 10-45 weight-%, more preferably 11-35 weight-%, calculated from the content of the reaction mixture at the beginning of the polymerization. The amount of starch, as defined here, provides the optimal particle size for the obtained copolymer particles of styrene and acrylate, as well as optimal stability for the obtained polymer dispersion.

The polymerization is carried out by addition of the monomers, which are more closely described below, either individually or as a mixture, and the free radical initiators suitable for initiating the polymerization, to the aqueous starch solution comprising degraded starch having an average molecular weight Mn<1000 g/mol. Thus the reaction mixture for the polymerization is formed. The polymerization process is typically carried in the absence of oxygen, preferably in an inert gas atmosphere, for example under nitrogen. According to one embodiment of the invention the total amount of monomers in the reaction mixture is 10-92 weight-%, preferably 20-90 weight-%, more preferably 35-88 weight-%, calculated from the total dry solids content of the reaction mixture. The amount of monomers refers here to the total amount of monomers (a), (b) and optional (c), which are added to the reaction mixture during the polymerization process. The monomers are normally added to the reaction mixture comprising aqueous starch solution during a predetermined time period.

The polymerization may be carried out by a feed process and by a batch process. A continuous polymerization process in a stirred kettle cascade or a flow tube is also possible. In a feed process, which is preferred, the monomers and the free radical initiator are metered uniformly into the degraded starch solution in a stirred reactor. During the entire preparation and polymerization process, thorough mixing with the aid of any suitable stirring or mixing units is maintained so that the added monomers and other components are homogeneously distributed as rapidly as possible.

The amount of monomer (a) is 0.1-75 weight-%, preferably 5-60 weight-%, more preferably 10-55 weight-%, calculated from the total dry solids content of the monomers (a), (b) and optional (c). According to one preferable embodiment the monomer (a) is selected from group comprising styrene, substituted styrenes, such as α-methylstyrene or vinyltoluene, and any mixtures thereof.

The amount of monomer (b) is 25-99.9 weight-%, preferably 30-95 weight-%, more preferably 35-90 weight-%, calculated from the total dry solids content of the monomers (a), (b) and optional (c). Suitable monomer (b) monomers are C1-C4-alkyl (meth)acrylate monomers, which are selected from group of C1-C4-alkyl acrylates, C1-C4-alkyl methacrylates or their mixtures, e.g. n-butyl, iso-butyl, tert-butyl or 2-butyl acrylate and the corresponding butyl methacrylates; methyl acrylate, methyl methacrylate, ethyl acrylate, ethyl methacrylate, propyl acrylate or propyl methacrylate. According to one preferred embodiment of the invention the monomer (b) is selected from butyl (meth) acrylates. It can comprise, for example, a mixture of at least two isomeric butyl acrylates. More preferably, the monomer component (b) is n-butyl acrylate, tert-butyl acrylate or a mixture of n-butyl acrylate and tert-butyl acrylate. For mixtures of two monomers (b) the mixing ratio may be from 1:99 to 99:1, sometimes from 10:90 to 90:10.

According to one embodiment of the present invention the reaction mixture comprises also at least one monomer (c), which is ethylenically unsaturated and different from monomers (a) and (b). Suitable other ethylenically unsaturated copolymerizable monomers (c) are selected from a group consisting of ethylhexyl acrylate, stearyl acrylate, stearyl methacrylate, esters of acrylic and methacrylic acid with alcohols which have more than four C atoms, and further acrylonitrile, methacrylonitrile, acrylamide, vinyl acetate and anionic co-monomers, such as acrylic acid, methacrylic acid, itaconic acid, maleic acid or styrene sulphonic acid. Acrylic acid and styrene sulphonic acid are preferably used as monomer (c).

The amount of the optional monomer (c) may be 0.1-15 weight-%, preferably 0.1-10 weight-%, more preferably 0.1-7 weight-%, calculated from the total dry solids content of the monomers (a), (b) and (c).

Initiators used for the polymerization are in conventional free radical initiators, preferably peroxo or azo compounds. Examples of these are hydrogen peroxide, sodium, potassium and ammonium peroxodisulphate, di-tert-butyl peroxide, dibenzoyl peroxide, azobisisobutyronitrile, 2,2'-azobis(2-methylbutyronitrile), 2,2'-azobis(2,4-dimethylvaleronitrile) and 2,2'-azobis(2-amidinopropane) dihydrochloride. Preferably the initiators are water-soluble, i.e. have a water solubility of >1 weight-% at 23° C. Hydrogen peroxide, potassium peroxodisulphate and ammonium peroxodisulphate are advantageous.

Above described free radical initiators may also be used in the presence of conventional reducing agents, thus forming a so-called redox initiator system, which is suitable to be used as initiator. Examples of conventional reducing agents are e.g. sodium sulphite, sodium bisulphite, sodium pyrosulphite, sodium hydrogen sulphite, sodium dithionite, sodium formaldehyde sulphoxylate, ascorbic acid and the sodium salt of hydroxymethanesulphinic acid.

Preferably the reducing agent is introduced as solution. It may be introduced continuously or periodically during the feeding of the monomers and initiator. Periodical introduction is preferred.

The free radical initiators, especially hydrogen peroxide, may also be combined with heavy metal salts, such as cerium (IV), manganese or iron (II) salts to give a redox system suitable to be used as a water-soluble initiator system providing high grafting yield. According to one embodiment of the invention the use of a combination of hydrogen peroxide and iron(II) salt as the graft-linking, water-soluble redox system is particularly preferred. The grafting yield is here understood the proportion of the polymer which is chemically coupled to the starch after the end of polymerization.

The polymerisation polymerization may be carried out so that the heavy metal salt of the redox system, e.g. the iron(II) salt, is added to the starch solution before the polymerization, while hydrogen peroxide is added in simultaneously but separately with the monomers. According to one embodiment of the invention iron(II) salt is usually used in concentration of 0.1-200 mg/l Fe(II) ion, preferably 1-45 mg/l Fe(II) ion, more preferably 2-18 mg/l Fe(II) ion, based on the total dispersion. Preferably the amount of iron(II) is as small as possible in order to avoid color problems in final dispersion and prepared paper. Hydrogen peroxide, calculated as 100%, is added in concentrations of 0.2 to 3.0 weight-%, based on monomers. This amount is additional to the amount of hydrogen peroxide which is optionally used for the starch degradation.

Ternary initiator systems consisting of free radical initiator, reducing agent and heavy metal salt are also suitable for polymerization. Reducing agent may be initially introduced together with iron(II) salt before the polymerization.

After the end of the addition of the monomers and the initiator, the reaction mixture is usually allowed to continue reacting for some time in order to complete the polymerization. The reaction times typically are between 0.5 and 10 hours, preferably between 0.75 and 5 hours. After this subsequent reaction time, a certain amount of initiator may added again in order to polymerise as substantially as possible the residual monomers still present in the reaction mixture.

The pH of the resulting polymer dispersion may be adjusted after the polymerization by adding suitable bases, such as alkali metal hydroxides and alkali metal acetates, preferably sodium hydroxide solution, potassium hydroxide solution or ammonia. A pH value in the range of 4-7 is preferably established thereby. Furthermore, buffer substances may also be added in order to stabilize the pH over the storage time.

Anionic or non-ionic low molecular weight emulsifiers, such as sodium alkanesulphonate, sodium dodecylsulphate, sodium dodecylbenzenesulphonate, sulphosuccinic esters, fatty alcohol polyglycol ethers, alkylaryl polyglycol ethers, etc., may be used in the polymerization in order to improve the dispersing effect, but the polymerization is therefore carried out in the absence of emulsifiers. Thus the polymerization is advantageously free from emulsifiers.

The molecular weight of obtained grafted-on polymer may further be adjusted by the concomitant use of chain-transfer agents or regulators, such as n-dodecyl mercaptan, tert-dodecyl mercaptan, n-butyl mercaptan, tert-butyl mercaptan, etc.

The concentration, i.e. dry solids content, of the obtained polymer dispersion according to the invention is typically >30 weight-%, more typically >35%, preferably 35-60 weight-%, more preferably 35-57 weight-%, based on the weight of the total dispersion.

According to one embodiment of the invention the polymer dispersion according has particle size D50 value <80 nm, preferably <75 nm and D99 value <160 nm, preferably <150 nm, more preferably <130 nm, sometimes even <115 nm. Typical polymer dispersion has D50 value in the range of 45-85 nm, preferably 45-80 nm, more preferably 45-75 nm, sometimes even 45-70 nm. Typical polymer dispersion has D90 value in the range of 70-160 nm, preferably 90-140 nm, more preferably 100-135 nm. All the particle sizes are measured by using Zetasizer Nano ZS, Malvern. D50 and D90 values refer to the respective values for $50^{th}$ and $90^{th}$ percentile of a volume based distribution.

The aqueous polymer dispersion is used as rheology modifier in a coating color additive. Coating color is here understood as a slurry, which comprises water, inorganic mineral particles and additive(s), such as binders and rheology modifiers. Coating color can be used for coating of paper, board or the like.

Suitable inorganic minerals that may be used in the present invention are calcium carbonate, kaolin, calcinated kaolin, talc, titanium dioxide, gypsum, chalk, satine white, barium sulphate, sodium aluminum silicate, aluminum hydroxide or any of their mixtures. Calcium carbonate may be ground calcium carbonate (GCC) or precipitated calcium carbonate (PCC) or their mixture. Preferably the inorganic mineral is calcium carbonate. Particle size D50 of the inorganic minerals used in coating compositions is typically in the range of <5 μm.

Typical binders that may be used in the present invention are starch and/or synthetic binders. Starch, which can be used as natural binder, may be native starch or modified starch, e.g. degraded starch or substituted starch. Typical synthetic binders are latex polymers based on butadiene, styrene, vinyl acetate, butyl acrylate and acrylic acid monomers. Typical synthetic latex binders that may be used in the present invention are latices known in the art, such as styrene butadiene (SB), styrene acrylate (SA) or polyvinyl acetate (PVAc) latices. Preferably the latex binder is styrene butadiene (SB) latex. Synthetic latex binders have a particle size around 0.1-0.2 μm.

The amount of synthetic binder in the coating color is in the range of 0.1-50 parts, preferably 1-25 parts, more preferably 1-20 parts.

The polymer dispersion according to the present invention can be used together with natural and/or synthetic binders. It is also possible to use the polymer dispersion as sole binder in the coating composition.

The amount of polymer dispersion according to the present invention in the coating color may be in the range of 0.1-50 parts, preferably 1-25 parts, more preferably 1-20 parts.

Typically the coating color according to the present invention has a solids content of 50-74%, preferably 60-72%, more preferably 65-71% and low shear viscosity <3500, typically 100-2000 mPas. Viscosities are measured by using Brookfield viscometer, type DV-II, with speed 100 rpm and using spindle 3 or 4.

As customary in the art, the amounts of coating components are given in parts. The amounts are calculated in relation to the amount of inorganic mineral pigment in the coating composition, and all the amounts are calculated and given as dry and active matter.

EXPERIMENTAL

Some embodiments of the invention are illustrated in the following non-limiting examples.

Example 1

Preparation of Polymer Dispersion A 148.0 g of an oxidatively degraded potato starch (Perfectamyl A 4692) was dispersed with stirring in 276 g of demineralizer water in a 1 l glass reactor with a cooling/heating jacket under a nitrogen atmosphere. The starch was dissolved by heating the mixture to 95° C. during 60 minutes. After the dissolution of starch, pH was adjusted to 2 with sulphuric acid. After 5 min mixing, 1.52 g of 1.0% strength aqueous solution of ferrous (II) sulphate heptahydrate was added in to the reactor. After 5 minutes 7.27 g of 30% strength hydrogen peroxide was added. After 120 minutes, the starch degradation was complete. The chemical feeds were started.

Monomers were fed as a mixture: 147.8 g of mixture of n-butyl acrylate and styrene (1:1 weight) was fed during 200 minutes. 16.2 g of 8% solution of hydrogen peroxide was fed simultaneously with the monomer feeds during 205 min. The reactor temperature was kept at 95° C. during the feeds and 15 minutes after for postpolymerization. Then the mixture was cooled to 60° C. and 0.4 g of 70% strength tert-butyl hydroperoxide solution was added into the reactor. The temperature was kept at 60° C. for further 60 min. Thereafter, cooling was effected to 40° C. and 1.5 g of 10% strength ethylenediaminetetraacetic acid sodium salt (EDTA-Na) solution was added, followed by pH adjustment to 6.2 with 50% strength sodium hydroxide solution and cooling to room temperature. Filtration was performed using a 100 μm filter cloth. A finely divided dispersion with a solid content of 46.3%, particle size 73 nm, viscosity 64 mPas, was obtained.

Example 2

Preparation of Polymer Dispersion B 70.4 g of an oxidatively degraded potato starch (Perfectamyl A 4692) was dispersed with stirring in 266 g of demineralizer water in a 1 l glass reactor with a cooling/heating jacket under a nitrogen atmosphere. The starch was dissolved by heating the mixture to 95° C. during 60 minutes. After the dissolution of starch, pH was adjusted to 2 with sulphuric acid. After 5 min mixing, 2.17 g of 1.0% strength aqueous solution of ferrous (II) sulphate heptahydrate was added in to the reactor. After 5 minutes 3.47 g of 30% strength hydrogen peroxide was added. After 120 minutes, the starch degradation was complete. The chemical feeds were started.

Monomers were fed as a mixture: 210.8 g of mixture of n-butyl acrylate and styrene (1:1 weight) was fed during 200 minutes. 41.0 g of 4.5% solution of hydrogen peroxide was fed simultaneously with the monomer feeds during 205 min. The reactor temperature was kept at 95° C. during the feeds and 15 minutes after for postpolymerization. Then the mixture was cooled to 60° C. and 0.57 g of 70% strength tert-butyl hydroperoxide solution was added into the reactor. The temperature was kept at 60° C. for further 60 min. Thereafter, cooling was effected to 40° C. and 2.2 g of 10% strength ethylenediaminetetraacetic acid sodium salt (EDTA-Na) solution was added, followed by pH adjustment to 6.2 with 50% strength sodium hydroxide solution and cooling to room temperature. Filtration was performed using a 100 μm filter cloth. A finely divided dispersion with a solid content of 46.1%, particle size 74 nm, viscosity 53 mPas, was obtained.

Example 3

Preparation of Coating Color and Coating Experiments

The following procedure is used for coating color make down in coating color 1:

100 parts of ground calcium carbonate (GCC), 75%, particle size <2 μm, and 4.5 parts styrene-butadiene latex is mixed together. 7 parts of cooked native starch, at solids content 28 weight-% is added to the mixture of GCC and latex. Water is added in order to obtain a coating color with target solids content of 60 weight-%. pH of the coating color is adjusted to pH 9.2 by using 10% sodium hydroxide. The coating color batch size is 500 g of dry pigment. Low shear viscosity is measured from the prepared coating color with Brookfield viscometer, type DV-II with speed 100 rpm using spindle 3. High shear viscosity is measured using Hercules Hi-Shear DV-10 rational viscometer. Static water retention is measured with Åbo Akademi Gravimetric Water Retention device.

Coating colors 2 and 3 are prepared in the same manner as coating color 1, except 4.5 parts of styrene butadiene latex is replaced in coating color 2 and 3 with 4.5 parts of polymer dispersions of Examples 1 and 2, as indicated in Table 1.

Coating color compositions are given in Table 1 and the obtained measurement results in Table 2.

TABLE 1

Coating color compositions used in Example 1.

|  | Coating color 1 | Coating color 2 | Coating color 3 |
|---|---|---|---|
| GCC | 100 | 100 | 100 |
| Styrene Butadiene Latex | 4.5 | | |
| Polymer dispersion A | | 4.5 | |
| Polymer dispersion B | | | 4.5 |
| Native starch | 7 | 7 | 7 |

TABLE 2

Measurement results for coating colors studied in Example 1.

| Property | Coating color 1 | Coating color 2 | Coating color 3 |
|---|---|---|---|
| pH | 9.2 | 9.2 | 9.2 |
| Solids Content [weight-%] | 60 | 60 | 60 |
| Temperature [° C.] | 23.1 | 23.1 | 23.5 |
| Low Shear Viscosity [mPas] | 304 | 341 | 325 |
| High Shear Viscosity [mPas] | 37 | 38 | 37 |
| Water Retention [g/m$^3$] | 68 | 46 | 48 |

From Table 2 it can be seen that when styrene-butadiene latex is replaced by using polymer dispersions according to the present invention, the static water retention of the coating color has improved without increasing coating color high shear viscosity.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A coating composition for coating of paper, board or the like, having a solids content of 50-74% and a low shear viscosity <3500 mPas, the coating composition comprising:
    water,
    inorganic mineral particles, and
    additive(s), including binders and a rheology modifier,
    wherein the rheology modifier is an aqueous polymer dispersion having a viscosity of ≤150 mPas at 40% solids content and comprising polymer particles having a particle size D50 less than 85 nm, the polymer dispersion being obtainable by free radical emulsion copolymerization of at least monomer (a) and monomer (b), wherein
    monomer (a) is at least one optionally substituted styrene, and
    monomer (b) is at least one C1-C4-alkyl (meth)acrylate, in a reaction mixture comprising degraded starch which has an average molecular weight of Mn<1000 g/mol.

2. The coating composition according to claim 1, wherein the aqueous polymer dispersion has the viscosity in a range of 1-150 mPas, measured at 40 weight-% solids content.

3. The coating composition according to claim 1, wherein the degraded starch has an average molecular weight of Mn<800 g/mol.

4. The coating composition according to claim 1, wherein the degraded starch has an average molecular weight Mn in a range of 100-790 g/mol.

5. The coating composition according to claim 1, wherein the degraded starch is non-ionic or has an anionic net charge.

6. The coating composition according to claim 1, wherein the degraded starch is degraded anionic potato or tapioca starch.

7. The coating composition according to claim 1, wherein the amount of degraded starch in the reaction mixture at the beginning of the polymerization is in a range of 5-60 weight-%.

8. The coating composition according to claim 1, further comprising optionally at least one monomer (c), which is ethylenically unsaturated and different from monomers (a) and (b).

9. The coating composition according to claim 8, wherein the monomer (c) is selected from a group consisting of ethylhexyl acrylate; stearyl acrylate; stearyl methacrylate; esters of acrylic and methacrylic acid with alcohols which have more than four C atoms; acrylonitrile; methacrylonitrile; acrylamide; vinyl acetate; and anionic co-monomers consisting of acrylic acid, methacrylic acid, itaconic acid, maleic acid and styrene sulphonic acid.

10. The coating composition according to claim 1, wherein the total amount of monomers in the reaction mixture is 10-92 weight-%, calculated from the total dry solids content of the reaction mixture.

11. The coating composition according to claim 1, wherein the amount of monomer (a) is 0.1-75 weight-%, calculated from the total dry solids content of the monomers (a), (b) and optional (c).

12. The coating composition according to claim 1, wherein the amount of monomer (b) is 25-99.9 weight-%, calculated from the total dry solids content of the monomers (a), (b) and optional (c).

13. The coating composition according to claim 1, wherein the monomer (a) is selected from a group comprising styrene, substituted styrenes, and any mixtures thereof, and/or the monomer (b) is selected from butyl (meth) acrylates.

14. The coating composition according to claim 1, wherein the polymer dispersion comprises polymer particles having particle size D50 in a range of 45-85 nm.

* * * * *